(12) United States Patent
Storer

(10) Patent No.: US 7,322,499 B2
(45) Date of Patent: *Jan. 29, 2008

(54) TRUCK SPORTS RACK

(76) Inventor: Ron D. Storer, 18111 Stratford Cir., Villa Park, CA (US) 92861

( * ) Notice: Subject to any disclaimer, the term of this patent is extended or adjusted under 35 U.S.C. 154(b) by 0 days.

This patent is subject to a terminal disclaimer.

(21) Appl. No.: 11/645,998

(22) Filed: Dec. 27, 2006

(65) Prior Publication Data

US 2007/0102468 A1    May 10, 2007

Related U.S. Application Data

(63) Continuation of application No. 10/770,214, filed on Feb. 2, 2004, now Pat. No. 7,198,185.

(51) Int. Cl.
*B60P 3/00* (2006.01)

(52) U.S. Cl. .................... 224/405; 224/403; 296/3

(58) Field of Classification Search ........ 224/402–405, 224/319, 546, 917.5, 310; 296/3, 37.1, 37.6, 296/10, 100.2, 102, 104; 248/689, 688, 352; 211/182, 191; 403/363, 403, 337, 205, 308
See application file for complete search history.

(56) References Cited

U.S. PATENT DOCUMENTS

| | | | |
|---|---|---|---|
| 2,492,841 A * | 12/1949 | Burkey .................. | 414/462 |
| 3,263,692 A | 8/1966 | Questi et al. | |
| D244,268 S | 5/1977 | Hinch | |
| 4,152,020 A | 5/1979 | Brown et al. | |
| D253,170 S | 10/1979 | Ramirez | |
| 4,211,448 A | 7/1980 | Weston | |
| D257,673 S | 12/1980 | Milton | |
| 4,267,948 A | 5/1981 | Lewis | |
| 4,278,175 A | 7/1981 | Jackson | |
| 4,659,131 A | 4/1987 | Flournoy, Jr. | |
| D295,084 S | 4/1988 | Weber | |
| 4,854,628 A | 8/1989 | Halberg | |
| D305,111 S | 12/1989 | Zagner | |
| D306,848 S | 3/1990 | Macor | |
| 5,002,324 A | 3/1991 | Griffin | |
| D316,391 S | 4/1991 | Lund | |
| D318,447 S | 7/1991 | Haugen et al. | |

(Continued)

OTHER PUBLICATIONS

Portax, The Ultimate Sports Rack, flyer.

*Primary Examiner*—Nathan J. Newhouse
*Assistant Examiner*—Corey N Skurdal
(74) *Attorney, Agent, or Firm*—Stetina Brunda Garred & Brucker

(57) ABSTRACT

Provided is a sports rack configured to be mounted on a truck bed. The truck bed may have a front wall, a rear tail gate and a pair of elongate side walls extending therebetween. Each one of the side walls may have a bed rail. The sports rack comprises a front frame member, a rear frame member and a plurality of channel lengths. The front frame member is disposed adjacent the front wall and extends between the side walls. The rear frame member is disposed over the rear tail gate and also extends between the side walls. The plurality of channel lengths extends horizontally between the front and rear frame members. Each of the front and rear frame members comprises a pair of upright end plates that may be used to mount the sports rack on the bed rails.

26 Claims, 6 Drawing Sheets

U.S. PATENT DOCUMENTS

| | | |
|---|---|---|
| 5,037,152 A | 8/1991 | Hendricks |
| 5,061,000 A | 10/1991 | Haugen et al. |
| 5,143,415 A | 9/1992 | Boudah |
| 5,152,570 A | 10/1992 | Hood |
| 5,152,574 A | 10/1992 | Tucker |
| 5,190,337 A | 3/1993 | McDaniel |
| 5,192,107 A | 3/1993 | Smith, Sr. |
| 5,303,858 A | 4/1994 | Price |
| 5,316,190 A | 5/1994 | Bullock |
| 5,381,939 A * | 1/1995 | Tippets ................ 224/526 |
| D360,614 S | 7/1995 | Alcocer |
| D363,460 S | 10/1995 | Marshall |
| 5,476,301 A | 12/1995 | Berkich |
| 5,492,259 A | 2/1996 | Tippets |
| D367,843 S | 3/1996 | Tayar |
| 5,560,666 A | 10/1996 | Vieira et al. |
| 5,692,791 A | 12/1997 | Sulzer |
| 5,732,496 A | 3/1998 | Tanaka |
| D394,639 S | 5/1998 | Carter |
| 5,752,734 A | 5/1998 | Ward et al. |
| 5,806,905 A | 9/1998 | Moore |
| D399,476 S | 10/1998 | Duncan |
| 5,836,635 A | 11/1998 | Dorman |
| 5,927,782 A | 7/1999 | Olms |
| D436,915 S | 1/2001 | Burger |
| D444,446 S | 7/2001 | Carter |
| 6,367,673 B1 | 4/2002 | Smith et al. |
| 6,394,524 B1 | 5/2002 | Morse |
| 6,439,646 B1 | 8/2002 | Cornelius |
| D463,358 S | 9/2002 | Thomas |
| D467,862 S | 12/2002 | Jenkins |
| 6,513,849 B2 | 2/2003 | Carter |
| 6,520,723 B2 | 2/2003 | Christensen |
| D493,414 S | 7/2004 | Condos et al. |
| D494,921 S | 8/2004 | Taylor |
| 6,883,848 B1 | 4/2005 | Iverson et al. |
| 6,942,275 B2 | 9/2005 | Corbett |
| 6,983,968 B2 | 1/2006 | Brauer et al. |
| 6,983,977 B1 | 1/2006 | Kozak et al. |
| D515,495 S | 2/2006 | Storer |

* cited by examiner

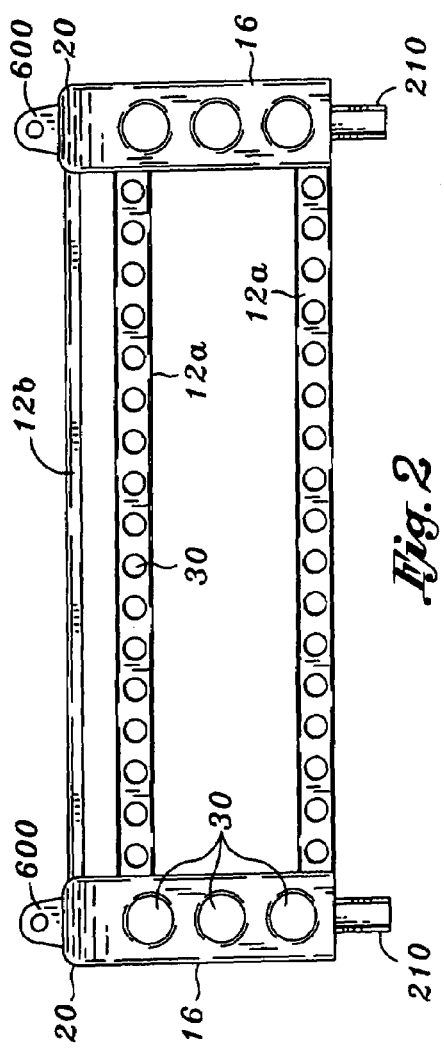
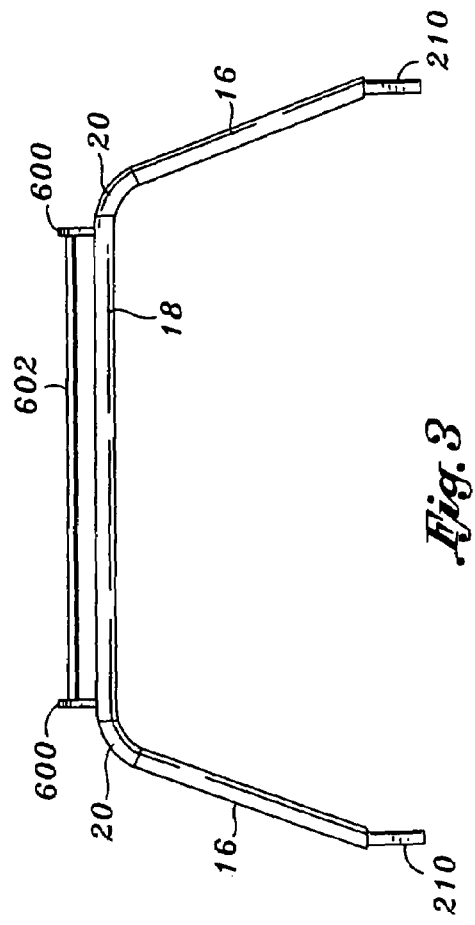

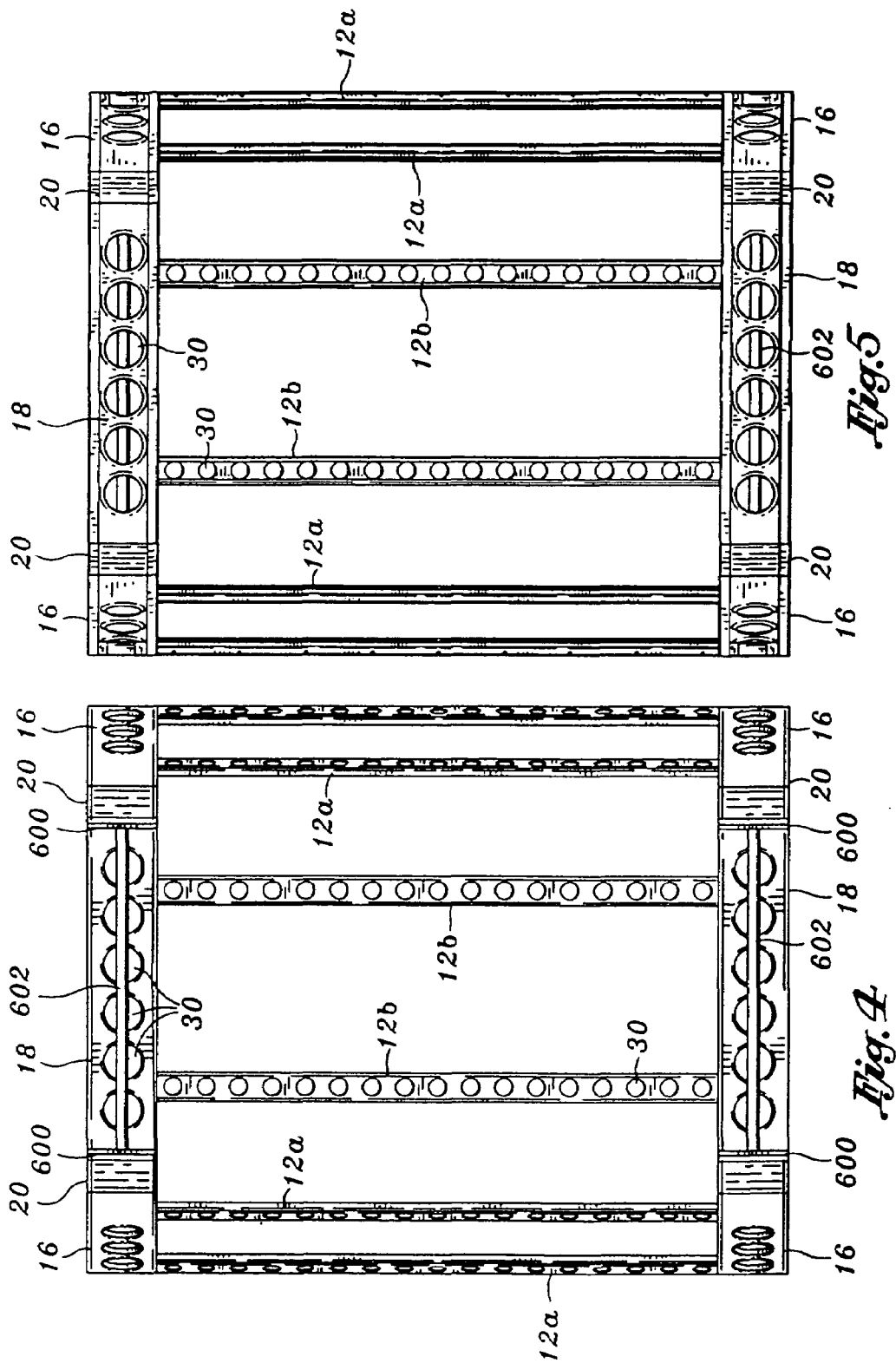

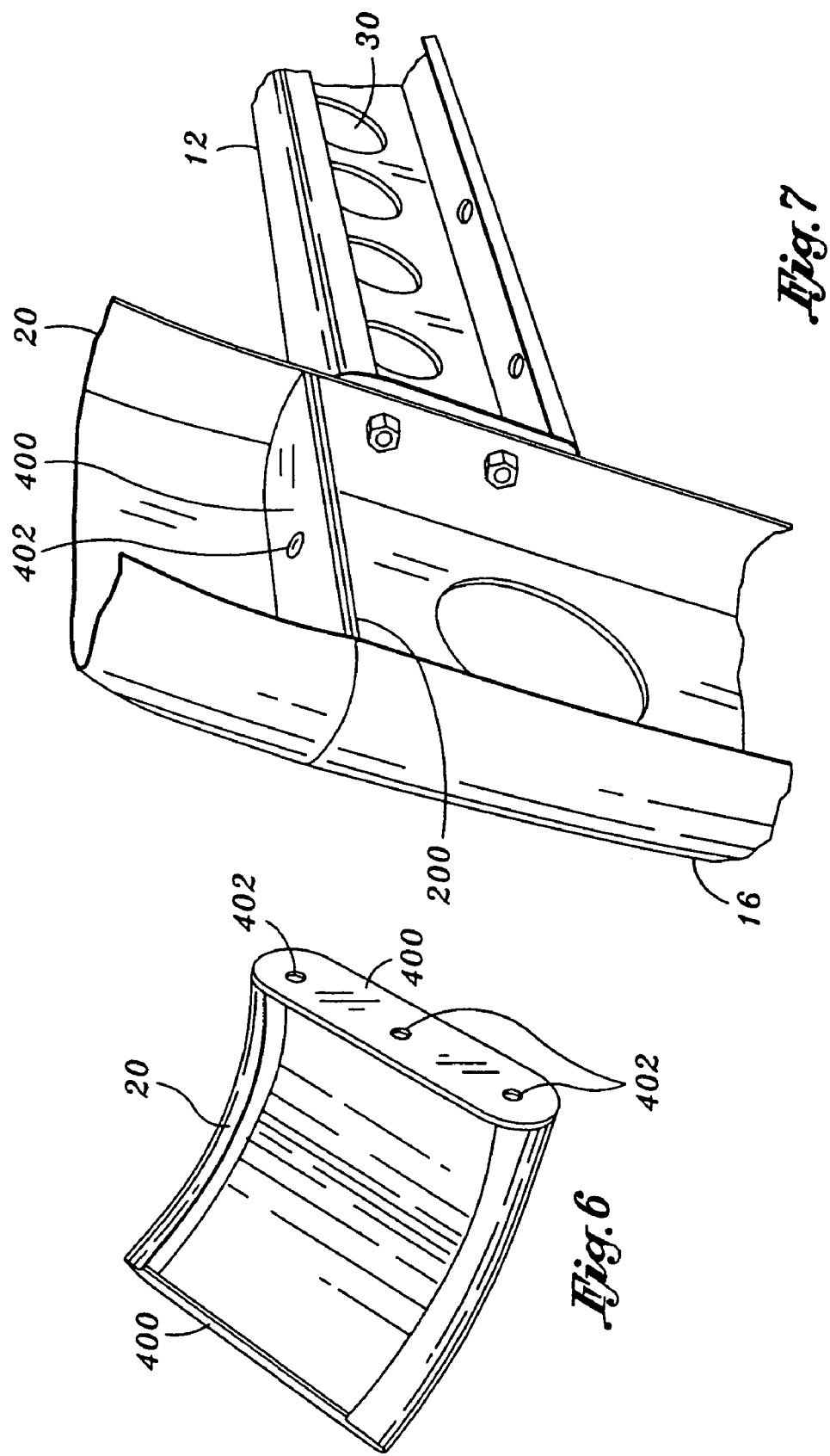

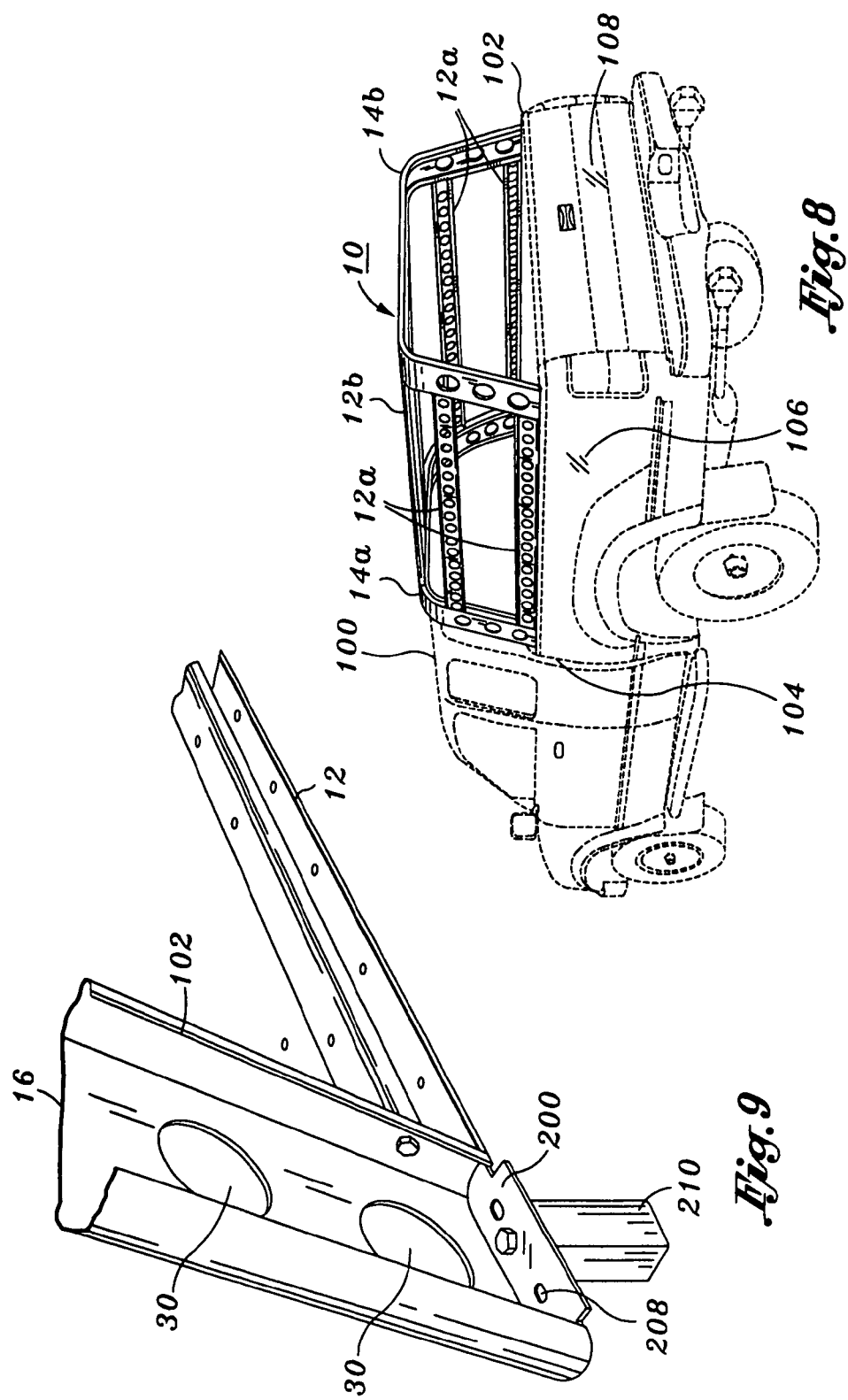

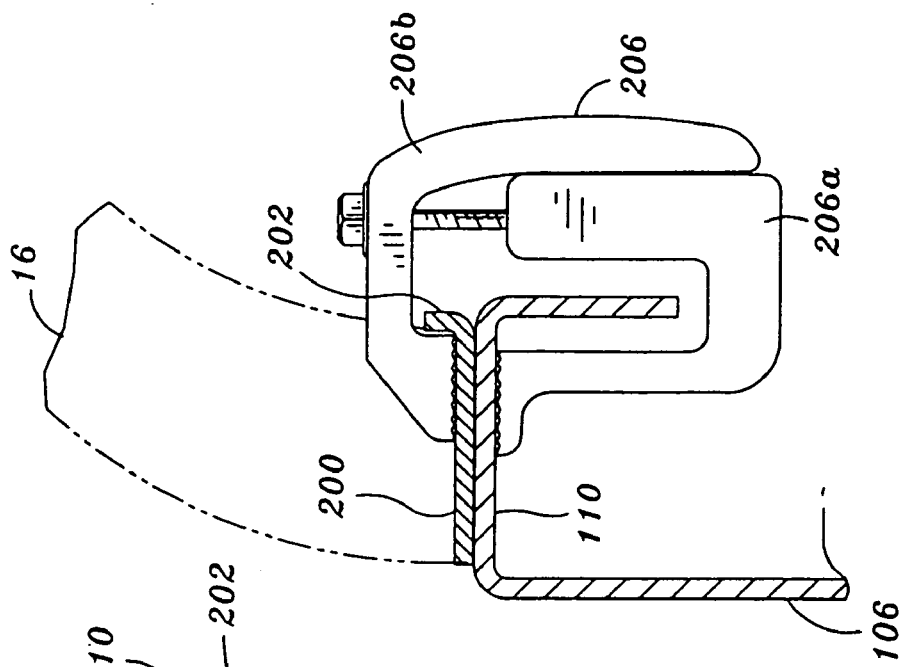
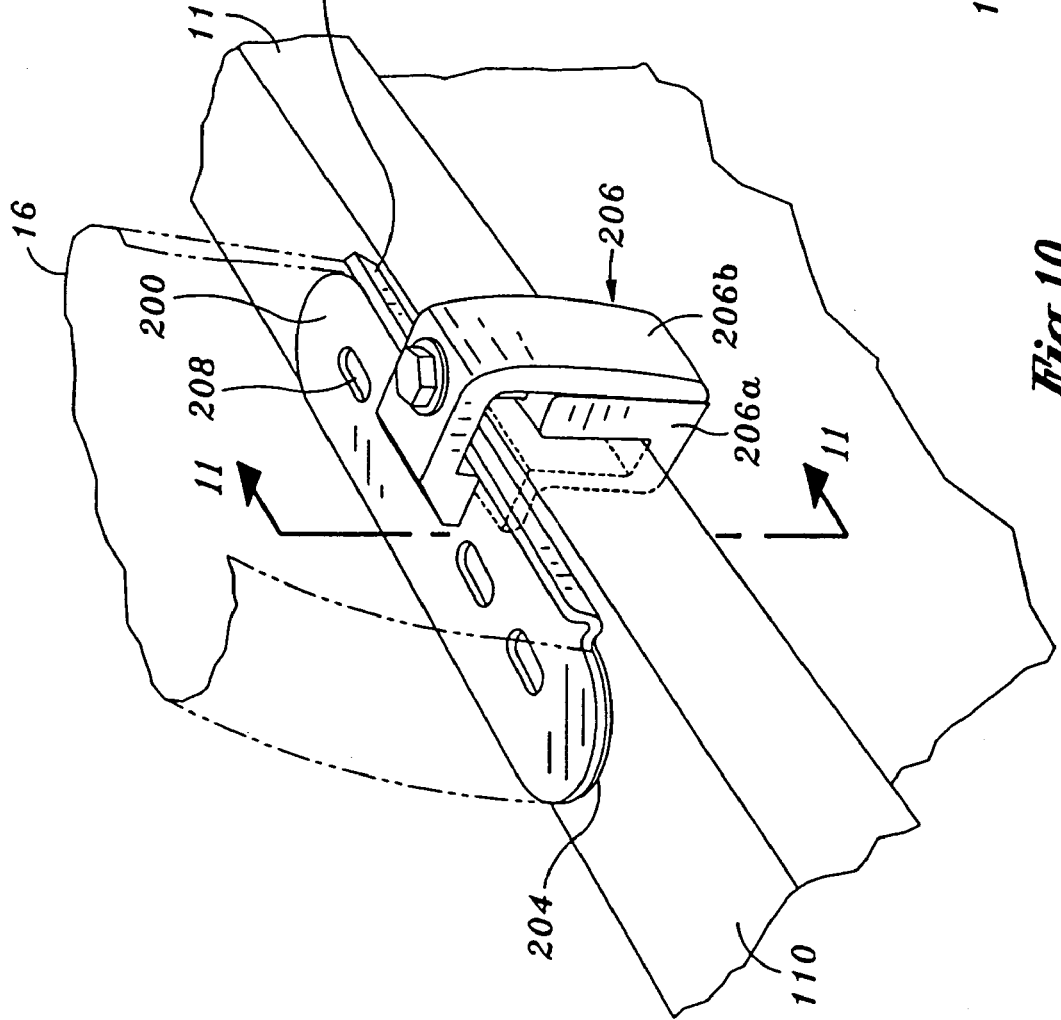

TRUCK SPORTS RACK

CROSS-REFERENCE TO RELATED APPLICATIONS

The present application is a continuation of U.S. patent application Ser. No. 10/770,214 entitled TRUCK SPORTS RACK filed Feb. 2, 2004, now U.S. Pat. No. 7,198,185, the entirety of the disclosures of which are expressly incorporated herein by reference.

STATEMENT RE: FEDERALLY SPONSORED RESEARCH/DEVELOPMENT

Not Applicable

BACKGROUND OF THE INVENTION

The present invention relates in general to a truck sports rack and, more particularly, to a truck sports rack that can be dissembled in pieces for shipment and quickly reassembled for such that it may be mounted on a truck.

Various types of truck racks have been developed for protecting goods or cargo carried on a truck bed of a truck. Conventional truck racks are either permanently mounted on a bed rail of a pickup truck or removably mounted on the truck using complex mounting hardware. For example, in published U.S. patent application No. 2003/0164621, U.S. Pat. No. 6,347,731, U.S. Pat. No. 5,927,782, racks disclosed therein each require specialized mounting mechanisms that comprise several elements for mounting the rack to the bed rail of a pickup truck. Unfortunately, none of these racks are easily mountable due to the relatively large number of mounting components and the large number of fasteners to interconnect such mounting components. In addition, most of these racks are constructed of relatively heavy bar, tubing or frame members which increases the difficulty in mounting and demounting the rack from the truck. Furthermore, the overall weight of such racks may have an adverse effect on handling of the truck on which it is mounted.

In addition, many prior art truck racks are provided as a unitary structure of welded construction. Such truck racks suffer from several deficiencies that detract from their overall utility. For example, truck racks that are provided as a welded construction result in a relatively large structure. Unfortunately, such truck racks must be provided in a relatively large variety of sizes in order to accommodate the wide variety of truck bed geometries that are available from the various truck manufacturers. In addition, the cost of shipping such truck racks from the manufacturer to retailers is relatively high due to the bulkiness of such truck racks. Furthermore, the cost of storing the truck racks and displaying the truck racks is also relatively large due to the large amount of space required. Such costs are ultimately passed on to the purchaser.

As can be seen, there exists a need in the art for a sports truck rack that may be assembled from a set of components such that the sports truck rack may be shipped in pieces and re-assembled by the ultimate purchaser. Also, there exists a need in the art for a sports truck rack that is easily adaptable for mounting to a wide variety of truck beds of varying geometry. In addition, there exists a need in the art for a truck sports rack that can be readily mounted to a wide variety of pickup trucks using only a few types of mounting mechanisms. Furthermore, there exists a need in the art for a truck sports rack that is lightweight and strong such that minimal effort is required to mount and demount the rack while the rack can support heavy weight. Finally, there exists a need in the art for a truck sports rack that is of simple construction with a relatively small number of components such that the overall cost of the truck sports rack may be minimized.

BRIEF SUMMARY OF THE INVENTION

The present invention provides a truck sports rack that can be easily dissembled in pieces for shipment and re-assembled such that it may be mounted on a truck. The sports rack is assembled of a plurality of lightweight, standardized components wherein the sports rack is of modular construction such that it may be easily adapted to fit a wide variety of truck beds. In addition, such modularity lowers the overall cost of the sports rack and enhances its transportability and storability. The sports rack comprises a pair of frame members and a plurality of channel lengths extending horizontally between the frame members. Each of the frame members and the channel lengths is perforated with a plurality of lightening holes for hanging or securing various objects. The lightening holes further reduces the overall weight of the sports rack such that mounting and demounting of the sports rack may be readily facilitated with minimal effort.

The sports rack comprises a pair of frame members and a plurality of elongate channel lengths extending between the frame members. Truck beds of many trucks typically have a front wall, a rear tail gate, and a pair of elongate side walls extending therebetween with a bed rail extending about a perimeter of the truck bed. The frame members may be configured as two substantially vertically disposed frame members that are respectively secured to the side walls of the truck bed. The channel lengths and the frame members are configured as horizontal members with a generally shallow U-shaped cross section to increase stiffness and rigidity of the channel lengths. The lightening holes may be formed in each one of the channel lengths and the frame members in order to reduce the overall weight of the sports rack.

Modularity of the sports rack is provided by the channel lengths which may be sized (i.e., provided in varying lengths) to be compatible with a specific truck bed geometry (i.e. truck bed length). The frame members span across the truck bed so as to be generally parallel with the front wall and rear tail gate. Each one of the frame members comprises a pair of uprights, a pair of corner pieces and a cross channel. The corner pieces interconnect the cross channel to the uprights such that each one of the frame assemblies exhibits a generally trapezoidally-shaped configuration. Modularity of the sports rack is also provided by the cross channels which may also be sized to be compatible with a specific truck bed geometry (i.e. truck bed width).

The frame members and the channel lengths may be fabricated from any material such as metal including aluminum, steel or stainless steel. However, other materials such as graphite composite materials and polymeric material (i.e., plastics) may also be used. The sports rack may comprise a pair of accessory brackets secured to each of the cross channels. A roller bar may be supported by the accessory brackets such that the sports rack may be used to transport various items such as sporting goods and construction equipment.

Each of the uprights, the cross channels, and the channel lengths is configured as a substantially flat elongate panel having side flanges extending from opposing edges to form a shallow U-shaped configuration. The corner pieces may be provided in a curved configuration in order to provide a smooth load path between the uprights and the cross channels as well as to improve the overall aesthetics of the sports rack. End plates on each end of the corner pieces may include corner piece end plate holes. Each of the uprights and the cross channels also include a pair of end plates at opposing ends with holes formed therethrough. Mechanical fasteners may be extended through the holes in order to interconnect the cross channels, corner pieces and uprights.

Many pickup trucks typically feature stake holes formed through top surfaces of the bed rails. The sports rack of the present invention exploits this feature by providing a stake mount extending downwardly from the end plate of each one of the uprights. By simply inserting the stake mount into a corresponding one of the stake holes, the sports rack may be mounted to the truck. In an additional mechanism for mounting the sports rack, a C-shaped bracket may be used to clamp the upright end plates to the bed rail. The bracket may include a lower clamp member and an upper clamp member which may be bolted together using a bolt or screw that passes through the upper clamp member and which is threadably engaged to a threaded hole in the lower clamp member. Clamping of the upright end plate and bed rail between the upper and lower clamp members may be performed by tightening the bolt.

BRIEF DESCRIPTION OF THE DRAWINGS

These, as well as other features of the present invention, will become apparent upon reference to the drawings wherein:

FIG. 2 is a side view of the sports rack;

FIG. 3 is a rear/front view of the sports rack;

FIG. 4 is a top view of the sports rack;

FIG. 5 is a bottom view of the sports rack;

FIG. 6 is a perspective view of one of the corner pieces of the sports rack;

FIG. 7 is an enlarged perspective view of a portion of the sports truck rack illustrating a connection between one of the channel lengths, one of the uprights and one of the corner pieces;

FIG. 8 is a perspective view of the sports rack as installed on a truck bed of a truck;

FIG. 9 illustrates the upright having a stake mount bolted thereto;

FIG. 10 is a perspective view of a rail mount as may used for mounting the sports rack to a bed rail of the truck bed; and FIG. 11 is a cross-sectional view of a C-shaped bracket having upper and lower clamp members for clamping the rack to the bed rail.

DETAILED DESCRIPTION OF THE INVENTION

Figure 1:
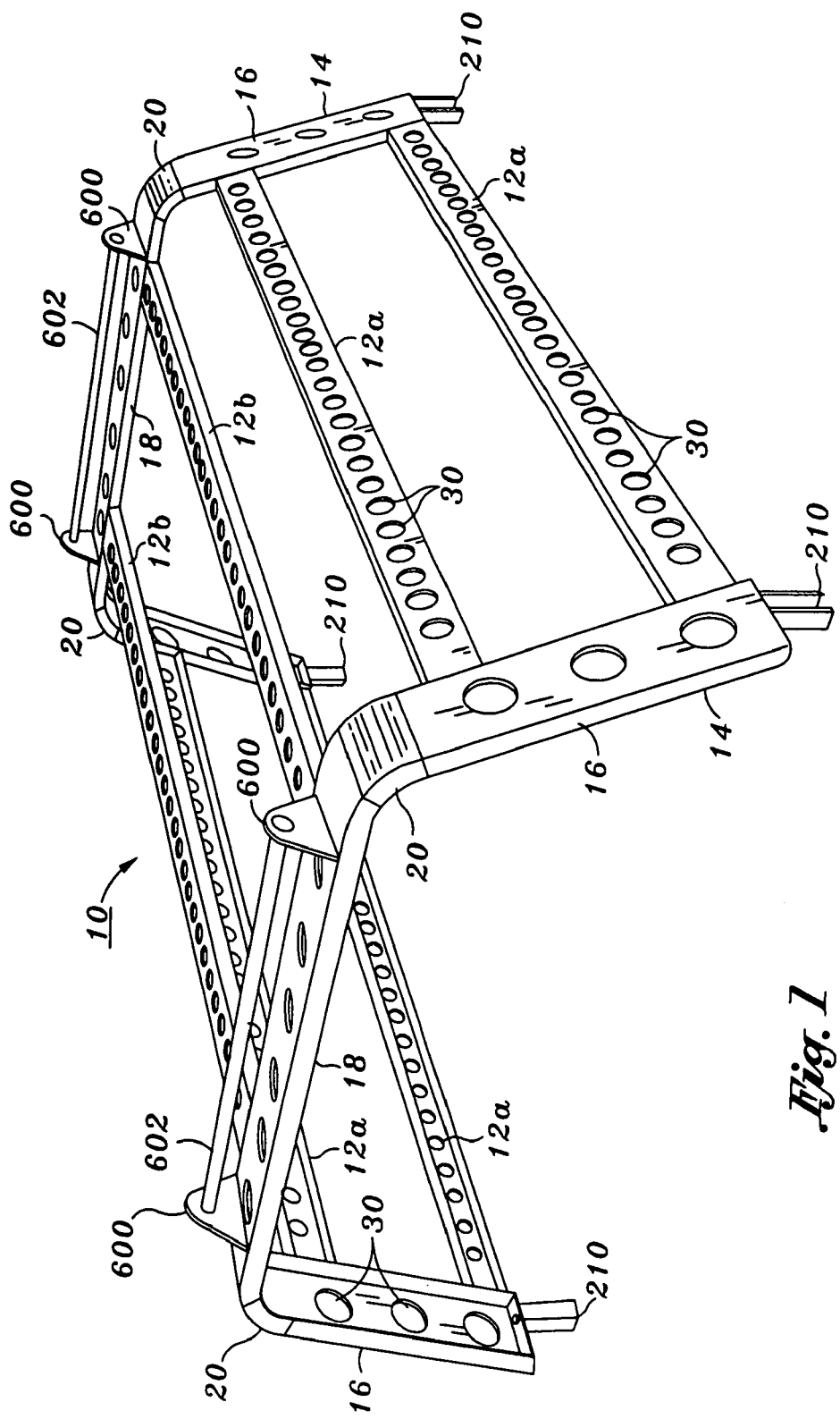
FIG. 1 is a perspective view of a truck sports rack of the present invention illustrating the interconnectivity of channel lengths, uprights, corner pieces and cross channels that make up the rack.

The present invention provides a sports rack 10 for a truck 100 such as a pickup truck 100 as shown in FIG. 8. As will become apparent in the description that follows, the rack has a modular construction allowing its fitment to a wide variety of trucks 100 having truck beds 102 of varying geometry. Furthermore, the rack is relatively lightweight such that it may be easily assembled, mounted on and demounted from the truck 100. The truck bed 102 may have a front wall 104, a rear tail gate 108, and a pair of elongate side walls 106 extending therebetween. The front wall 104 and side walls 106 may each include a bed rail 110 extending along a perimeter of the truck bed 102. The sports rack 10 may be mounted on the side bed rails 110 of the pickup truck 100 by various mechanisms that will be described in detail below.

The sports rack 10 comprises a pair of frame members 14 and a plurality of elongate channel lengths 12 extending between the frame members 14. The frame members 14 may be configured as two parallel substantially vertically disposed frame members 14 including a front frame member 14*a* and a rear frame member 14*b*. The front frame member may be disposed upon and removably secured to the side bed rails 110 of the truck bed 102. The rear frame member 14*b* may similarly be disposed upon and removably secured to the side bed rails 110 although the frame members 14 may be disposed anywhere along the truck bed 102. The channel lengths 12 are configured as horizontal members with a generally shallow U-shaped cross section to increase stiffness and rigidity of the channel lengths 12. Likewise, the frame members 14 may also be configured with a generally shallow U-shaped cross section.

Importantly, a plurality of lightening holes 30 may be formed in each one of the channel lengths 12 and the frame members 14 in order to reduce the overall weight of the sports rack 10. The channel lengths 12 may be disposed to extend in a direction generally parallel to the side walls 106 of the truck bed 102. Modularity of the sports rack 10 is provided by the channel lengths 12 which may be sized to be compatible with specific truck bed 102 geometry (i.e. length). The frame members 14 may be disposed to span across the truck bed 102 so as to be generally parallel with the front wall 104 and rear tail gate 108. As shown in FIG. 1, each of the frame members 14 comprises a pair of uprights 16, a pair of corner pieces 20 and a cross channel 18. The corner pieces 20 interconnect the cross channel 18 to the uprights 16 such that each one of the frame assemblies exhibits a generally arch-shaped or trapezoidally-shaped configuration. Modularity of the sports rack 10 is also provided by the cross channels 18 which may also be sized to be compatible with specific truck bed 102 geometry (i.e. width).

In the embodiment shown in FIG. 1, the channel lengths 12 include four side channel lengths 12*a* and two top channel lengths 12*b*. More specifically, each one of opposing sides of the sports rack 10 includes two side channel lengths 12*a* extending between the uprights 16. A top of the sports rack 10 includes two top channel lengths 12*b* extending between the cross channels 18. It will be appreciated that the quantity of the channel lengths 12 may be altered according to specific requirements without exceeding the spirit or scope of the present invention. For example, the sports rack 10 may include only one of the side channel lengths 12*a* at each one of opposing sides of the sports rack 10. The sports rack 10 may also include only two of the top channel lengths 12*b*.

Preferably, the frame members 14 and the channel lengths 12 are fabricated from metal such as aluminum, steel or stainless steel. However, other materials such as graphite composite materials and polymeric material (i.e., plastics) may also be used for fabricating the frame members 14 and the channel lengths 12. To avoid the risk of harm to persons and/or property, all of the frame members 14 and all of the channel lengths 12 may be fully radiused in order to remove otherwise sharp edges. The sports rack 10 further may comprise a pair of accessory brackets 600 secured to or formed with each of the cross channels 18. A roller bar 602 having two ends may be supported by the accessory brackets 600. The roller bar 602 may be used to transport sporting items such as kayaks, surfboards, windsurfers and canoes. The roller bar 602 may also be used to transport construction equipment such as ladders, scaffolding, lumber and piping. The apertures 30 may additionally be used to mount various accessories.

FIGS. 2, 3, 4 and 5 are, respectively, the side view, rear/front view, top view and bottom view of the sports rack 10. Each of the uprights 16, the cross channels 18, and the channel lengths 12 is configured as a substantially flat elongate panel with two side flanges extending from opposing edges of the panel to form the above-mentioned shallow U-shaped configuration. The elongate panel is perforated with a plurality of the lightening holes 30 to reduce weight. In addition, the lightening holes 30 provide attachment points from which various objects may be hung or secured. Preferably, the frame member 14 width is greater than that of the channel lengths 12 in order to provide sufficient support thereof. Because the width of the frame members 14 is greater than that of the channel lengths 12, the lightening holes 30 formed on the frame members 14 may be sized to be proportionally larger than those formed on the channel lengths 12 in this embodiment. However, it is contemplated that the lightening holes 30 may be provided in any number of shapes and sizes.

As shown in FIG. 2, opposing ends of each one of the side channel lengths 12a may be connected to the sides of corresponding ones of the uprights 16. Ends one of the top channel lengths 12b may be connected to the sides of the cross channels 18, as shown in FIGS. 4 and 5. Referring to FIG. 3 which illustrates the front/rear view of the sport rack 10, upper ends of the uprights 16 are generally inclined towards each other in order to form the generally arch shape or trapezoidal shape of the frame members 14 wherein tops of the frame members 14 are sized to be generally narrower than bottoms of the frame members 14.

As mentioned above, the corner pieces 20 are used to interconnect the cross channel 18 to the uprights 16. FIG. 6 shows a perspective view of a corner piece 20. As shown, the corner piece 20 is preferably curved to provide a smooth load path between the uprights 16 and the cross channels 18. In addition, the curved configuration of the corner piece 20 may improve the overall aesthetics of the sports rack 10. In the embodiment shown FIG. 6, the corner piece 20 includes an end plate 400 at each end thereof. Each end plate 400 is perforated with at least one corner piece end plate hole 402. It will be appreciated that different configurations can also be applied to the corner pieces 20 without exceeding the scope or spirit of the present invention. For example, each of the corner pieces 20 may comprises a plurality of curved bars or tubing terminating in perforated end plates.

Similar to the corner pieces 20, each of the uprights 16 and the cross channels 18 also comprise a pair of end plates at opposing ends thereof. In this manner, the uprights 16 and the cross channels 18 may be bolted together to form the frame members 14 as shown in FIG. 7. FIG. 7 also shows the connection between one of the uprights 16 and one of the side channel lengths 12a. As shown, each end of the side channel length 12a also comprises an end plate perforated with two holes, while a corresponding side panel of the upright 16 is also perforated with at least two holes aligned with the holes of the end plate of the side channel length 12a such that the side channel length 12a may be bolted to the upright 16. It should be noted that the uprights 16 may be connected to the cross channels 18 by any suitable means including, but not limited to, a combination of bolts and nuts, or a combination of bolts that engage threaded bosses that are fastened to the corner pieces 20.

Various types of mounting mechanisms can be applied to mount the sports rack 10 to the truck 100. Many pickup trucks typically include the feature of stake holes formed through top surfaces of the bed rails 110. Taking advantage of this feature, a simple mounting mechanism can be provided for mounting the sport rack 10 to the bed rails 110. For example, as shown in FIG. 9, a stake mount 210 is bolted to the end plate 200 of each one of the uprights 16. By simply inserting the stake mount 210 into a corresponding one of the stake holes formed in the bed rail 110, the sports rack 10 may be mounted to the truck 100 as shown in FIG. 8 with minimal use of installation tools or fastening hardware. As shown in FIG. 8, the sports rack 10 may be mounted to the truck 100 with the frame members 14 located adjacent the front wall 104 and the rear tail gate 108 of the truck bed 102. The side channel lengths 12b are generally positioned over the side walls 106 of the truck bed 102. When the sports rack 10 is mounted over the truck bed 102 as shown in FIG. 8, a canopy or tent may be applied thereon in order to further secure goods or cargo carried in the truck bed 102 as well as to provide some degree of protection from the elements of weather.

FIGS. 10 and 11 illustrate an additional mechanism for mounting the sports rack 10 to the truck 100. As shown, upright end plates 200 of each one of the uprights 16 may be placed on the top surfaces of the bed rails 110. The upright end plate 200 may further includes a flange or lip 202 projecting generally outwardly and generally perpendicularly from the upright end plate 200. Such lip 202 may provide additional stiffness to the upright end plate 200. The lip 202 may extend continuously along the upright end plate 200. Preferably, a rubber gasket 204 may be interposed between each one of the upright end plates 200 and the bed rails 110 to act as an interface between the upright end plate 200 and the bed rail 110. In this regard, the rubber gaskets 204 may prevent rubbing of the bed rails 110 which would otherwise abrade or scrape the bed rail 110 finish (i.e. paint). When the upright end plates 200 are positioned on the bed rail 110, a C-shaped bracket 206 may be used to clamp the upright end plate 200 to the bed rail 110.

As shown in FIGS. 10 and 11, the C-shaped bracket 206 may include a lower clamp member 206a and an upper clamp member 206b which may be bolted together using a bolt or screw that passes through the upper clamp member 206b and which is threadably engaged to a threaded hole in the lower clamp member 206a. Clamping of the upright end plate 200 and bed rail 110 between the upper and lower clamp members 206a may be performed by tightening the bolt in order to cause relative axial movement between the upper and lower clamp members 206a. Compressive force is thereby applied to sandwich the upright end plate 200 to the bed rails 110 to prevent axial movement of the sports rack 10 relative to the truck bed 102 while frictional forces prevent lateral movement thereof.

Alternatively, mounting of the sports rack 10 to the truck bed 102 may be achieved by including upright end plate holes 208 in each one of the upright end plates 200. FIG. 10 shows the upright end plate 200 of each one of the uprights end plate 202 being perforated with four of the upright end plate holes 208. The top surface of the bed rail 110 may be drilled to provide plural holes formed therethrough and positioned complementary to the upright end plate holes 208. In this manner, the sports rack 10 may be positioned such that the upright end plate holes 208 may be aligned with the holes formed through the top surface of the bed rail 110. Mechanical fasteners may then be used to secure the sports rack 10 to the bed rail 110 of the truck 100.

This description of the various embodiments of the present invention is presented to illustrate the preferred embodiments of the present invention, and other inventive concepts may be otherwise variously embodied and employed. The appended claims are intended to be construed to include such variations except insofar as limited by the prior art.

What is claimed is:

1. A sports rack, comprising:
   a pair of frame members each including:
   a pair of uprights;
   a cross channel; and
   a pair of corner pieces adapted to interconnect the pair of uprights to the cross channel;
   wherein the uprights, cross channels and corner pieces each have a pair of end plates disposed at opposing ends thereof, the end plates being oriented to be placed in abutting contact with one another when the uprights, cross channels and corner pieces are adapted to be mounted to each other; and
   a plurality of channel lengths adapted to be removably connected to the frame members and extending horizontally therebetween;
   wherein each one of the frame members and channel lengths is perforated with a plurality of lightening holes.

2. The sports rack of claim 1, wherein the frame members are configured as two vertically disposed parallel frame members.

3. The sports rack of claim 1, wherein:
   the sports rack is configured to be mounted on a truck bed having a pair of spaced side walls extending between a front wall and a rear tail gate;
   one of the frame members of the pair being positioned adjacent the front wall;
   the other one of the frame members of the pair being positioned adjacent the rear tail gate.

4. The sports rack of claim 1, wherein:
   each one of the corner pieces is arch-shaped;
   upper ends of the uprights being inclined towards each other.

5. The sports rack of claim 1, wherein the channel lengths further comprise:
   at least one side channel length extending horizontally between the uprights at sides of the frame members; and
   at least one top channel length extending horizontally between the cross channels of the frame members.

6. The sports rack of claim 1, wherein the corner pieces are fabricated from metal, plastic or graphite.

7. The sports rack of claim 1, wherein each of the channel lengths has two opposing ends, each one of the ends being adapted to be mounted to the frame members.

8. The sports rack of claim 1, wherein each of the frame members includes a pair of stake mounts extending downwardly therefrom.

9. The sports rack of claim 8, wherein the stake mount is configured to be inserted into stake mount holes formed in the side walls.

10. The sports rack of claim 3, wherein each of the uprights further comprises:
    at least one upright end plate being disposed at a lower end of the upright;
    a lip protruding perpendicularly from the upright end plate; and
    a pair of C-shaped brackets extending over the lip and configured to clamp the upright end plate to one of the side walls.

11. The sports rack of claim 10, wherein each one of the C-shaped brackets includes a lower clamp member and an upper clamp member adapted to be mounted to each other.

12. The sports rack of claim 10, wherein a relative position between the lower clamp member and the upper clamp member is adjustable such that the side wall and the upright may be captured between the lower and upper clamp members.

13. The sports rack of claim 1, wherein each of the frame members further comprises a pair of upright end plates having at least one upright end plate hole adapted to be mounted to the frame member to an upper surface of the side wall.

14. The sports rack of claim 1, wherein each of the frame members further comprises a pair of accessory brackets mounted thereon in spaced relation to one another.

15. The sports rack of claim 14, wherein each of the frame members further comprises a roller bar extending between the pair of accessory brackets.

16. The sports rack of claim 1, wherein the frame members and the channel lengths are fabricated of metal.

17. The sports rack of claim 1, wherein the frame members and the channel lengths are fabricated of aluminum, steel, stainless steel or graphite.

18. A sports rack configured to be mounted on a truck bed having a front wall, a rear tail gate and a pair of elongate side walls extending therebetween, each one of the side walls having a bed rail, the sports rack comprising:
    a front frame member disposed over the front wall and extending between the elongate side walls;
    a rear frame member disposed over the rear tail gate and extending between the elongate side walls; and
    a plurality of channel lengths extending horizontally between the front and rear frame members;
    wherein each of the front and rear frame members comprises:
    a pair of uprights each having a pair of upright end plates adapted to be mounted on each one of the bed rails;
    a cross channel; and
    a pair of corner pieces adapted to be mounted to the pair of uprights to the cross channel;
    wherein the uprights, cross channels and corner pieces each have a pair of end plates disposed at opposing ends thereof, the end plates being oriented to be placed in abutting contact with one another when the uprights, cross channels and corner pieces are mounted to each other.

19. The sports rack of claim 18, wherein:
    each of the front and rear frame members comprises a pair of stake mounts extending downwardly therefrom;
    the stake mounts being configured to be inserted into stake mount holes formed in the bed rails.

20. The sports rack of claim 18, further comprising:
    a plurality of C-shaped brackets;
    a lip protruding perpendicularly from a lowermost one of each of the upright end plates; and
    wherein each one of the C-shaped brackets is adapted to be extended over the lip and configured to clamp the upright end plates to the bed rails.

21. The sports rack of claim 18, further comprising at least one rubber gasket interposed between the upright end plates and the bed rail.

22. The sports rack of claim 18, wherein each of the upright end plates are perforated with at least one upright end plate hole, the elongate side walls including a plurality of holes positioned complementary to each of the upright end plate holes and being formed through upper surfaces of the bed rail and adopted to be mounted to the upright end plates.

23. The sports rack of claim 18, wherein the channel lengths extend between and are adapted to be mounted to sides of the front and rear frame members.

24. The sports rack of claim 18, wherein a canopy is adapted to be mounted over the front frame member, rear frame member, and channel lengths.

25. A sports rack configured to be mounted on a truck bed having a front wall, a rear tail gate and a pair of elongate side walls extending therebetween, each one of the side walls having a bed rail, the sports rack comprising:
- a front frame member adapted to be mounted over the front wall and extending between the elongate side walls;
- a rear frame member adapted to be mounted over the rear tail gate and extending between the elongate side walls; and
- a plurality of channel lengths extending horizontally between the front and rear frame members;

wherein each of the front and rear frame members comprises:
- a pair of uprights each having a pair of upright end plates oriented to be flush-mounted upon each one of the bed rails;
- a cross channel; and
  - a pair of arch-shaped corner pieces interconnecting the pair of uprights to the cross channel;
  - the uprights, cross channels and corner pieces each having a pair of end plates at opposing ends thereof, the end plates being oriented to be placed in abutting contact with one another when the upright, cross channels and corner pieces are adapted to be mounted, the uprights, cross channels and corner pieces having matching U-shaped cross sectional configurations.

26. The sports rack of claim 25, wherein a canopy is adapted to be mounted over the front frame member, rear frame member, and channel lengths.

* * * * *